United States Patent [19]

Mehrgardt et al.

[11] Patent Number: 4,964,046

[45] Date of Patent: Oct. 16, 1990

[54] HARVARD ARCHITECTURE MICROPROCESSOR WITH ARITHMETIC OPERATIONS AND CONTROL TASKS FOR DATA TRANSFER HANDLED SIMULTANEOUSLY

[75] Inventors: Soenke Mehrgardt, March; Martin Winterer, Gundelfingen, both of Fed. Rep. of Germany

[73] Assignee: Deutsche ITT Industries GmbH, Freiburg, Fed. Rep. of Germany

[21] Appl. No.: 453,027

[22] Filed: Dec. 22, 1989

Related U.S. Application Data

[63] Continuation of Ser. No. 198,369, May 25, 1988, abandoned.

[30] Foreign Application Priority Data

Jun. 2, 1987 [EP] European Pat. Off. ........ 87107915.8
Dec. 17, 1987 [EP] European Pat. Off. ........ 87118741.5

[51] Int. Cl.$^5$ ............................................... G06F 9/00
[52] U.S. Cl. ..................................... 364/200; 364/270
[58] Field of Search ...................... 364/200 MS File

[56] References Cited

U.S. PATENT DOCUMENTS

| | | |
|---|---|---|
| 3,775,756 | 11/1973 | Balser . |
| 4,079,455 | 3/1978 | Ozga . |
| 4,149,244 | 4/1979 | Anderson et al. .................. 364/200 |
| 4,258,418 | 3/1981 | Heath ................................. 364/200 |
| 4,258,419 | 3/1981 | Blahut et al. ...................... 364/200 |
| 4,524,455 | 6/1985 | Holsztinski et al. ................ 364/200 |
| 4,722,051 | 1/1988 | Chattopaphia ...................... 364/200 |

OTHER PUBLICATIONS

Data sheet for "SN54S281, SN74S281 4-Bit Parallel Binary Accumulators," *The TTL Data Book for Design Engineers*, Second Edition, Texas Instruments Incorporated, 1976, pp. 7-740 through 7-414.

Microprocessors and Microsystems, Band 10, Nr. 4, May 1986, pp. 202-210, Butterworh & Co. Ltd., London, GB; A. Clements: "Exception Handling in the 68000, part 1".

Microprocessors and Microsystems, Jun, 1986, pp. 258-267, A. Clements: "Exception handling in the 68000, Part 2".

HP-85 I/O Programming Guide, Hewlett Packard, Feb., 1981, pp. 65-74, U.S.; "End-of-Line Branching".
Compcon, Spring 83, Digest of Papers, pp. 278-285, IEEE, New York, U.S.; T. R. Gross: "Code optimization Techniques for Pipelined Architectures".
Funkschau, Band 57, Oct. 1985, pp. 58-62, Muchen, DE; M. Schutz: "So Funktioniert der digitale Fernseher".
P. von Bechen, "32-Bit-Mikrocomputer für signalverarbeitung und Prozesssteuerung" (32-bit microcomputer for Signal Processing and Process Control), *Elektronik*, No. 22, Nov. 5, 1982, pp. 139-141.
Joel H. Dedrick, "Multiport register file simplifies and speeds digital signal processing," *Electronic Design*, vol. 32, No. 10, May 1984, pp. 213-222.
G. Ungerboeck, et al., "Architecture of a digital signal processor," *IBM Journal of Research and Development*, vol. 29, No. 2, Mar. 1985, pp. 132-139.

Primary Examiner—Gareth D. Shaw
Assistant Examiner—John Mills
Attorney, Agent, or Firm—Thomas L. Peterson

[57] ABSTRACT

A central processor for digital signal processing operates at a high clock rate. In the central processor, data is transferred and processed largely in parallel and simultaneously. A buffer is inserted in the data link between a data memory and an ALU by means of at least three data buses so that within one clock period, all necessary data transfers for a two-address operation of the ALU are performed by using the buffer. In particular, a unidirectional data bus and a bidirectional data bus transfer data from the buffer to the ALU, and the bidirectional data bus transfers the result of an ALU operation back to the buffer. Simultaneously with the transfers between the buffer and the ALU, a data transfer is performed between the data memory and the buffer. The data transfers and the data processing are controlled by a control unit in which a fixed program is stored segment by segment. The use of pipelining in the control unit permits a high processing speed. The use of delayed branching is supplemented by the skip technique. The central processor does not utilize interrupt control. Rather, a scheduler selectively changes the sequence in which a program operates in response to an external or internal task request only at the end of the segment currently being executed so that the current program segment is concluded without interruption.

3 Claims, 4 Drawing Sheets

INSTRUCTION WORD FORMAT

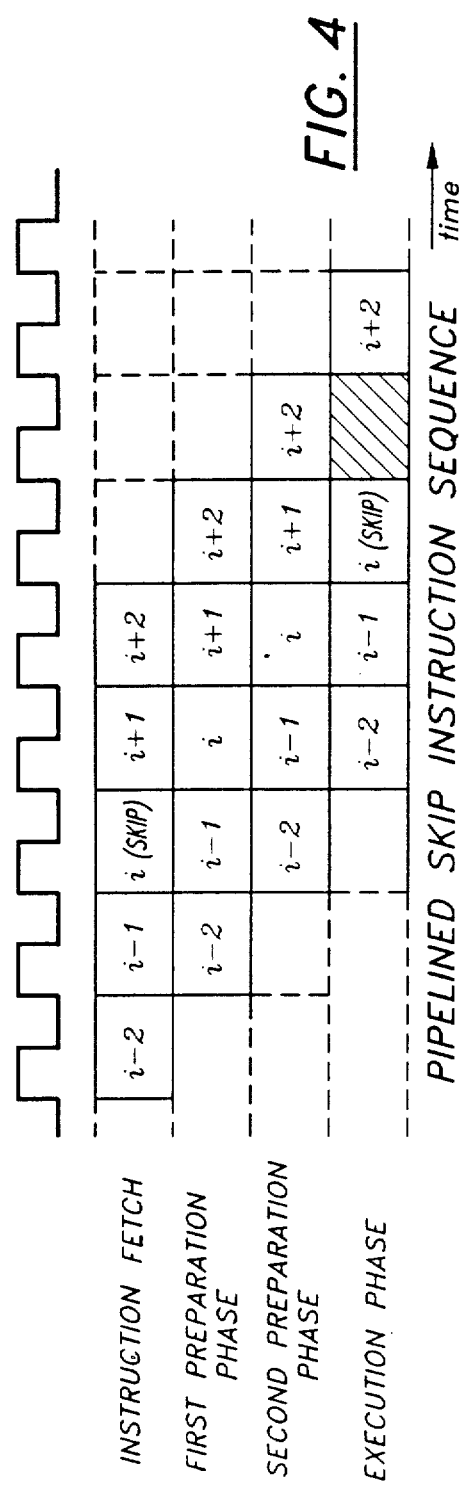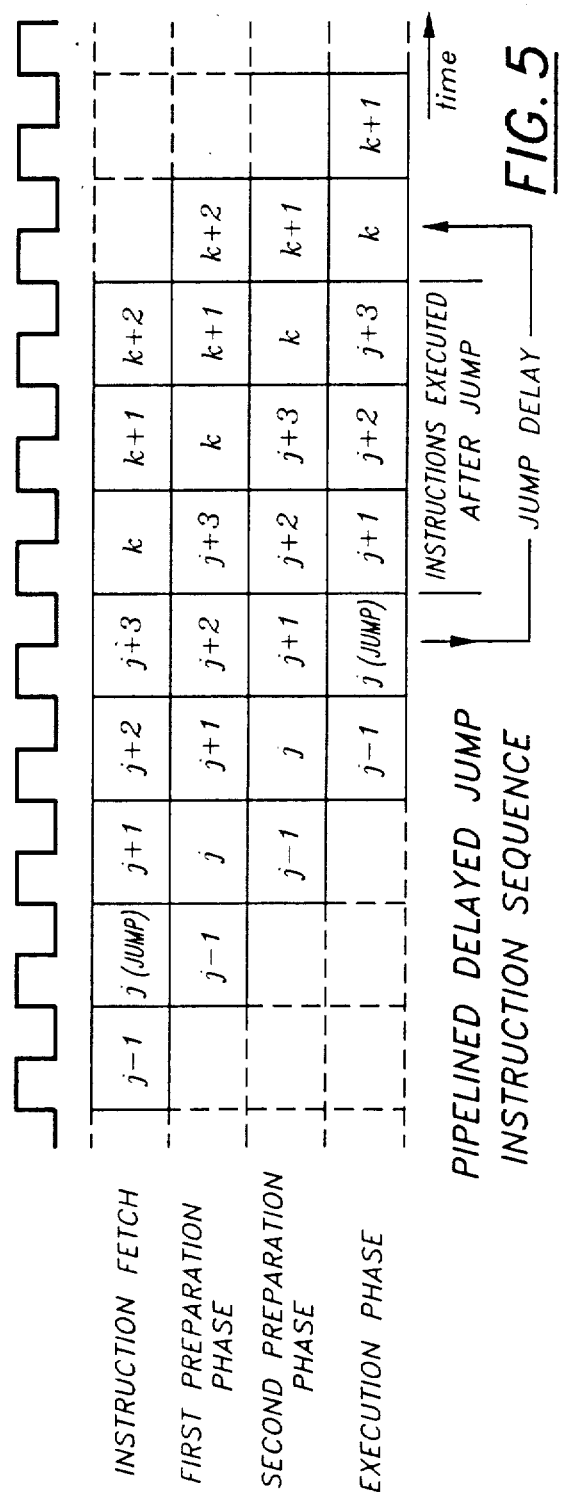

HARVARD ARCHITECTURE MICROPROCESSOR WITH ARITHMETIC OPERATIONS AND CONTROL TASKS FOR DATA TRANSFER HANDLED SIMULTANEOUSLY

This is a continuation of U.S. patent application Ser. No. 198,369, filed May 25, 1988, now abandoned.

BACKGROUND OF THE INVENTION

1. Field of the Invention

The present invention is in the field of digital electronic computers, and, more particularly, is in the field of monolithic integrated circuit central processors as used in microprocessors or microcomputers.

2. Description of the Related Art

An exemplary monolithic integrated central processor includes an arithmetic logic unit ("ALU") connected to a data memory by data lines. The central processor further includes a control unit connected via control lines to both the ALU and the data memory. The control unit controls the exchange of data between the data memory and ALU and controls the data processing performed by the ALU. For pure control tasks, such central processors, also called "microprocessors," usually contain a fixed program which is adapted to a process control task, for example. If the program is alterable, e.g., for use in a computer, the central processor is often called a "microcomputer."

Such processors are typically based either on the Von Neumann architecture, which uses common signal paths or buses for the transfer of data or instructions, or on the so called Harvard architecture, in which the data channels and the control channels are separated. The latter architecture is preferably used where high processing speed is important because data and instructions are transferred over separate buses in parallel rather that serially.

A central processor based on the Harvard architecture is described, for example, in "32-Bit-Mikrocomputer für Signalverarbeitung und Prozeasteuerung," *Elektronik*, No. 22, Nov. 5, 1982, pp. 139-141. The described processor is a 32-bit high-performance microcomputer which is suitable for fast signal processing.

SUMMARY OF THE INVENTION

It is the object of the present invention to make such a Harvard architecture processor even faster. To attain this object, a processor structure is proposed in which the arithmetic operations and the control tasks for data transfer are handled simultaneously. This is made possible by a buffer interposed between the data memory and the ALU. In case of branches, the speed-increasing pipelining technique remains applicable even at a great pipelining depth through the combination of "delayed branching" with conditional or unconditional skip instructions, and the commonly used interrupt control is replaced by a program segmentation which permits an interrupt or a jump only at the end of a segment.

The buffer is the heart of the processor. For the sake of clarity, the data transfer through the buffer in case of purely parallel signal processing, but without the use of pipelining, will be explained first. Assuming two address operations for the ALU and a single data transfer between the data memory and the buffer during one clock period, the buffer must move data across three memory cells in one cycle, i.e., one memory cell is only read from by the ALU, a second is both read from and written into by the ALU, and a third is either read from or written into by the data memory. In that case, at least a bidirectional first data bus is necessary between the data memory and the buffer, and at least a bidirectional second data bus is necessary between the buffer and the ALU. A unidirectional third data bus is provided to connect the buffer to the ALU.

A high processing speed, both in the ALU and in the data memory and the buffer, is made possible by the use of pipelining. In that case, however, the two bidirectional data buses must be replaced by oppositely directed unidirectional data buses, because in an extreme case, five memory cells are then needed per clock period for independent data transfers to handle a basic operation. For example, the result of an addition at the ALU output is shifted by at least one clock period with respect to the instant of data input, so that this result can no longer be simply returned to either of the two memory cells which were involved in the data input and are thus connected to the ALU. Reading from and writing into the data memory then requires two memory cells, too. Conflicts during buffer access are prevented either by a decision logic or by suitable programing.

Investigations with a number of programs have shown that, on an average, the control of data transfer and the control of the ALU require approximately the same number of operations. The proposed architecture with the buffer and with simultaneous control of the entire data transfer and the data processing in the ALU therefore results in a balanced division of the computer capacity and, thus, in a speed increase by a factor of up to 2.

The invention thus teaches a fast monolithic integrated central processor which can perform most of the control functions preferably in digital television-signal-processing, image-reproducing and/or data-reproducing apparatus.

In the central processor according to the invention, relatively inflexible, hardware-bound processing is replaced by an adaptable, software-controlled circuit concept for processing and generating all signals required to synchronize a cathode-ray tube or other image-reproducing apparatus, for example. In addition to this synchronizing function, the central processor makes it possible to directly generate the horizontal deflection voltage via suitable interface circuits, so that this system can be adapted to the respective characteristics of different picture tubes or other reproducing equipment via a suitable program in optimum fashion. New deflection concepts, such as sinusoidal deflection for flicker suppression, in which the screen is written on during both the sinusoidal horizontal sweep and the sinusoidal horizontal flyback, can be readily implemented. It is also possible to generate the signals necessary to control switched-mode power supplies.

The input signals for the central processor come from various interface circuits which suitably condition external, possibly yet-to-be-digitized, signals, e.g., separate the synchronizing signals or limit the vertical and horizontal retrace voltage pulses. Additional circuits, which may be incorporated in the central processor, perform additional tasks, such as a digitally controlled oscillator ("DCO") which generates the high-frequency clock system for the digital signal processing circuits.

The applications of a suitably expanded central processor include: generation of vertical and horizontal synchronizing pulses; phase-locked loops with switchable or adaptive capture and hold-in characteristics (e.g., for horizontal synchronization); DCO control; calculation of sawtooth-shaped vertical-deflection voltages or currents; calculation of horizontal and/or vertical pincushion correction; calculation of sawtooth-shaped or other horizontal-deflection voltages or currents, including corrections; generation of correction signals for dynamic focusing; generation of the various keying pulses; generation of the driving pulse for horizontal or vertical retrace in transistor or thyristor output stages; measurement of phase difference between a synchronizing pulse and a horizontal flyback pulse; driving signals for a switched-mode power supply; standards identification and multistandard operation; video-signal clamping; and picture-height adjustment and framing.

Most of the signals can be calculated and delivered by the central processor in real time. In the case of signals that have to be calculated only occasionally, it may be advantageous to perform the calculation only once directly after power turn-on or after each mode change, and to store the result in a random-access memory. The latter, together with a digital-to-analog converter serves as a control-signal source (if an analog control signal is required). It is also possible to use read-only memories, but flexibility is limited in that case. By using several central processors in one unit to perform additional functions, efficiency can be further increased.

BRIEF DESCRIPTION OF THE DRAWINGS

The invention will now be explained in greater detail with reference to the accompanying drawings, in which:

FIG. 4 illustrates an exemplary pipelined instruction sequence showing the effect of a skip instruction;

FIG. 5 illustrates an exemplary pipelined instruction sequence showing the effect of a delayed jump instruction.

DETAILED DESCRIPTION OF THE PREFERRED EMBODIMENT

Figure 1:
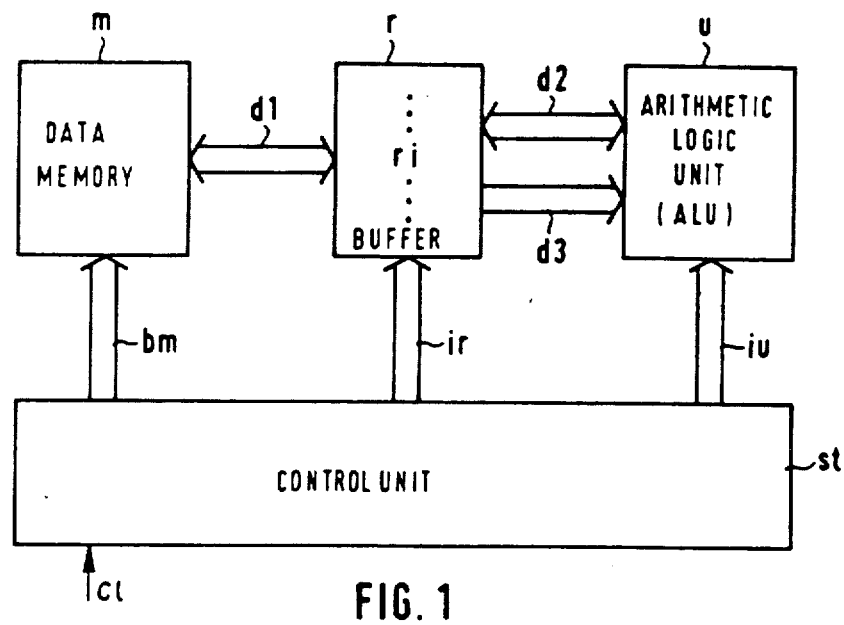
FIG. 1 is a simplified block diagram that illustrates the basic concept of the architecture according to the invention.

FIG. 1 is a simplified block diagram that illustrates the central processor of the present invention. The central processor includes an ALU u, a data memory m, a buffer r and a control unit st. The central processor is operated in synchronism with a clock signal which is shown as an input to the control unit st. The arithmetic operations and the data transfers are performed in parallel, i.e., without the use of pipelining. Interposed between the ALU u and the data memory m is the buffer r, into which data can be written and from which data can be read simultaneously from both sides (i.e., both by the data memory m, via the first bidirectional data link, and by the ALU u, via the second bidirectional data link). Thus, the ALU u can be kept in continuous operation, because its input and output data are, respectively, fetched from and stored in the buffer r at the same time.

The first bidirectional data link comprises the bidirectional first data bus d1. The second bidirectional data link comprises the bidirectional second data bus d2 and the unidirectional third data bus d3. The data in the unidirectional third data bus d3 flows in the direction of the ALU u.

For speed or cost reasons, it may be advantageous in some applications to replace a bidirectional data bus with at least two oppositely directed unidirectional data buses. The replacement of each of the bidirectional data buses with at least two oppositely unidirectional buses is also preferable if the pipelining technique is employed. In that case, the individual data is divided, according to the pipelining-processing depth, into individual data areas which are processed in time sequence in parallel paths. Accordingly, the data of these data areas is called for and stored separately and in sequence, which, of course, requires separate unidirectional data buses, because the two data transfers take place over the bidirectional data link simultaneously, but in opposite directions.

Figure 3:
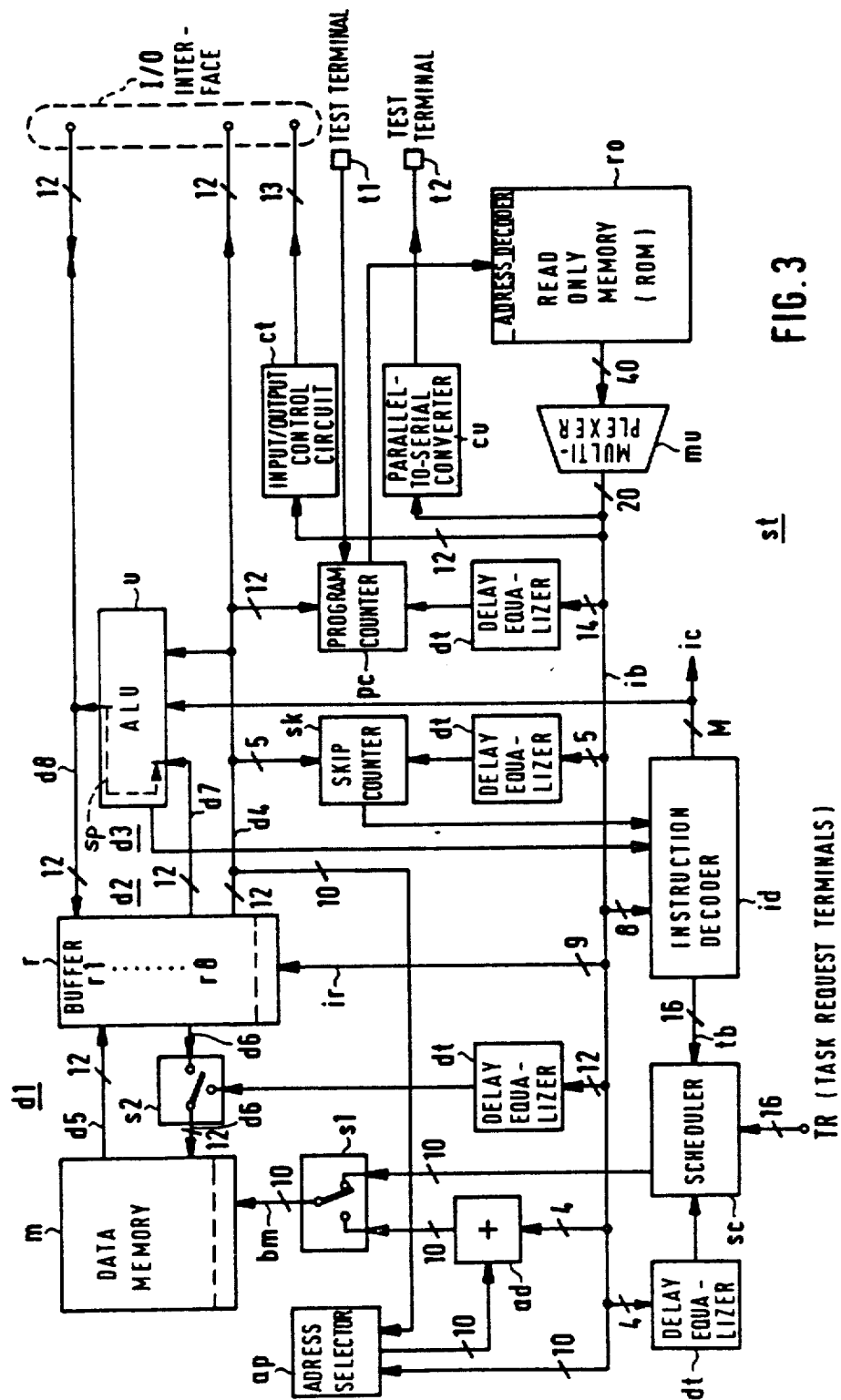
FIG. 3 a detailed block diagram of the central processor of the present invention.

To further increase the computing speed, the central processor is preferably operated with a reduced instruction set as is used in RISC architectures, RISC being the abbreviation for Reduced Instruction Set Computer. In the embodiment of FIG. 3, to be discussed below, the instruction set consists of 32 instructions, as opposed to conventional architectures, which may have up to 130 instructions.

The reduced instruction set permits the following functions to be performed in the ALU u if two data words are applied: addition, right and left shifting, and, as a logic function, the formation of the AND or the exclusive-OR of the two applied data words. Since the latter can also be inverted, this instruction set makes it possible to perform all logic functions necessary for a signal processor.

The buffer r may contain a few additional memory cells which serve to store intermediate results or frequently used constants. In the embodiment of FIG. 3, these are the three additional memory cells r6, r7, r8 although the buffer r is only connected to five unidirectional data buses d4 to d8. This, too, increases the computing speed.

A further increase in computing speed would be obtained if the ALU u performed three-address operations instead of two-address operations, and if two independent data transfers could be performed between the data memory and the buffer in one clock period, so that the data memory would be a so-called dual-port memory. Both measures would further increase the minimum number of memory cells ri required and the number of associated data buses.

The data traffic and the logic operations in the ALU u are controlled by the control unit st. The control unit st is connected to the data memory m by the data memory control bus bm, to the buffer r by the buffer control bus ir, and to the ALU u by the ALU control bus iu. The data memory m contains a RAM ("random-access memory") with an address decoder and further associated circuits. The control unit st contains a control-unit memory ro (FIG. 3), which is preferably a ROM ("read-only memory") which, in the preferred embodiment, holds a list of about 2000 segmented instructions.

Figure 2:
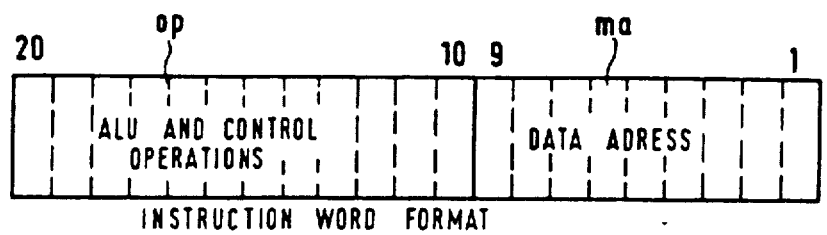
FIG. 2 schematically illustrates the format of an instruction stored in the control-unit memory.

FIG. 2 shows the format of an exemplary 20-bit instruction word stored in the control-unit memory ro (FIG. 3) of the control unit st of FIG. 1. The first to the ninth bit of the instruction word specifies the data address ma in the data memory m, while the tenth to the twentieth bit specifies the associated ALU and control operations op. During the processing of an instruction word, the data transfers between the data memory m and the buffer r, as specified by the data address portion ma of the instruction word, and the ALU and control operations, as specified by the ALU and control operations portion op of the instruction word, along with the associated data transfers between the ALU u and the buffer r, are performed simultaneously within one clock period.

Signal processing in the control unit st is preferably based on the pipelining principle. Problems arise only if there are departures from the normal sequence of program steps, i.e., if the program contains branches. If, in the program loop of FIG. 3, the program contains a branch instruction at a pipelining depth of N, the program flow after the multiplexer mu will change N clock periods later. It is, therefore, common practice to insert a corresponding number of no-operation instructions into a branch instruction covering several clock periods. However, this causes a branch or a jump to become a multicycle instruction. This is contrary to the aim to use only single-cycle instructions. Therefore in the central processor, of the present invention a "delayed-jump" method is preferably used. Instructions which are still in the program sequence after a jump instruction are obeyed until the jump actually takes place. In the program list, the jump instruction is shifted upwards by the number of instructions by which the actual execution of the jump is delayed. As a result, however, program control becomes very difficult.

Therefore, use is preferably made of the "skip technique," which was employed in many earlier computers. A conditional skip instruction causes the next instruction to be performed or not to be performed. This technique is used to skip a predetermined number of instructions. At first glance, skip instructions appear to be nothing but short branch instructions in the forward direction; however, they are compatible with the pipelining technique. The program control can be implemented to advantage by using a complete set of conditional and unconditional skip instructions together with the delayed-branching technique. The use of skip instructions in an exemplary pipelined instruction sequence in a processor having a pipelining depth of four (i.e., N=4) is illustrated in FIG. 4. The instruction sequence comprises instructions . . . i−2, i−1, i+1, i+2, i+3 . . . . As illustrated, the pipelining technique causes the instructions to overlap in time. As indicated in parenthesis, the instruction i is a SKIP instruction which causes the next instruction i+1 to be skipped (as indicated by the cross hatching) and execution to continue with the instruction i+2. The SKIP instruction can be either an unconditional SKIP or a conditional SKIP instruction.

In contrast to the SKIP instruction sequence of FIG. 4, FIG. 5 illustrates a delayed jump instruction sequence which comprises a first instruction sequence . . . J−2, j−1, j, j+1, j+2, j+3. As illustrated, the instruction j is a JUMP instruction to an instruction k at the beginning of a second instruction sequence k, k+1, k+2 . . . . When the instruction j is executed, the instruction k is fetched into the beginning of the pipeline; however, the instructions j+1, j+2 and j+3 ahead of the instruction k in the pipeline are executed prior to the execution of the instruction k.

Another special feature of the central processor according to the present invention is that, unlike comparable circuits, it incorporates no interrupt control; nevertheless, it can respond to external program requests relatively quickly. In a conventional interrupt control, the direct consequence of an interrupt instruction is that the internal status of the processor must be safeguarded or stored. In the case of the buffer r, this would either take up additional time, because the data in all memory cells r1 . . . r8 would have to be read and stored, or require additional circuitry as additional memory cells would have to be provided for the interrupt data.

In the present invention, the program in the control-unit memory ro is preferably divided into segments to permit the implementation of a comparable interrupt function. While a segment is being executed, no interrupt is possible. At the end of a segment, a jump to the beginning of another segment is possible. The segment to be jumped to is determined by the scheduler sc ("jump-address generator"), as shown in FIG. 3. This jump is possible on the basis of the jump addresses stored in the data memory m as a list containing, e.g., 16 jump addresses for the beginnings of the individual segments.

The jump addresses can be called by the scheduler sc via specific instructions entered into it as different program requests from outside through the task request terminals TR, or internally via a program instruction stored in the control-unit memory ro. Through one of the e.g., 16 task request terminals TR, the central processor can thus be informed which of 16 possible programs is to be executed next. The task request instructions also include test routines or other special routines via which otherwise inaccessible memory contents, for example, become accessible from outside. The maximum length of each of the program segments is determined by the maximum external response time.

FIG. 3 shows a detailed example of the central processor. The numbers of bits carried by the data or control buses are indicated by the numbers next to the oblique strokes in the buses. The word length of the output data and, thus, the word length in the data memory m and the buffer r is 12 bits. The central processor is accessible from outside through the input/output interface I/O and the task request terminals TR. As in FIG. 1, the data memory m, the buffer r, the ALU u, and the associated data buses d1, d2, d3 are shown. The control unit st is divided into subcircuits.

The clock rate of the preferred embodiment of the central processor is 40 MHz. To permit the control-unit memory ro to be read from at half the clock rate, two successive instruction words are read from the control-unit memory ro simultaneously. The multiplexer mu following the output of the control-unit memory ro produces two successive 20-bit instruction words for the instruction bus ib. Each of the instruction words has the format shown in FIG. 2. Part of the instruction bus ib, namely 9 of the 20 lines, represents the buffer control bus ir, which controls the address decoder of the buffer r direct.

The data memory m is controlled via its address decoder, which is controlled over the data memory control bus bm. The 10 conductors of the data memory control bus bm are the output lines of the first electronic switch sl, whose first and second bus inputs are connected to the ten-bit outputs of the adder ad and the scheduler sc, respectively.

One input of the adder ad is connected to the ten-bit bus output of the address selector ap, and the other input is fed with four bits of the instruction bus ib. The input signals for the address selector ap are 10 bits of the instruction bus ib or 10 bits of the fourth data bus d4, which forms part of the second or third data bus d2, d3 of FIG. 1.

In FIG. 3, the bidirectional first data bus d1 of FIG. 1 is replaced by two oppositely directed unidirectional data buses, namely a fifth data bus d5 and a sixth data bus d6. The sixth data bus d6 feeds the data memory m, containing the second electronic switch s2. The second electronic switch s2 is selectively operated so that instead of the 12 bits from the buffer r, 12 bits from the instruction bus ib, via a delay equalizer st can be written into the data memory m.

Figure 6:
FIG. 6 illustrates the timing relationship between the data into and the data out of the ALU during pipelined instruction operation.

The two data inputs of the ALU u are connected to the buffer r by the fourth data bus d4 and a seventh data bus d7. The fourth data bus is connected through the input/output interface I/O to an external device. The output of the ALU u is coupled via an eighth data bus d8 both to the input/output interface I/O and to a data input of the buffer r. As discussed above, the central processor preferably operates in a pipeline fashion. This is illustrated in FIG. 6, wherein the input data on the fourth data bus d4 during a particular time period i is represented as $d4_i$, the input data on the fourth data bus d4 during the next succeeding time period i+1 is represented as $d4_{i+1}$, and so on. Similarly, the input data on the seventh data bus d7 at the same particular time period i is represented as $d7_i$, during the next succeeding time period i+1 as $d7_{i+1}$, and so on. The output data on the eighth data bus d8 resulting from the ALU operation on the input data $d4_i$ and $d7_i$ is represented as $d8_i$. It can be seen that the output data $d8_i$ occurs at the next succeeding time period i+1 and is thus transmitted to the buffer r at the same time as the new input data for the time period i+1 (i.e., $d4_{i+1}$ and $d7_{i+1}$) are provided as inputs to the ALU.

The input/output interface I/O and the eighth data bus d8 are used to enter data into the buffer r from outside without interference from the ALU u, while data is transferred from the buffer r to an external device over the fourth data bus d4. The associated addresses are fed out through an additional terminal of the input/output interface I/O, namely 12 bits of the instruction bus ib, which are transferred out through the input/output control circuit ct.

The ALU u further includes internally switchable data paths (represented by a dashed line sp in FIG. 3) which permit output data of the ALU to be fed back directly to one of its inputs, e.g., during continuous accumulation. This eliminates the otherwise necessary indirect route through the buffer r and, thus, the delay caused in the buffer-ALU processing path by the use of pipelining.

The fourth data bus d4, which is connected to the input/output interface I/O, is also connected to the input of the skip counter sk and to the input of the program counter pc. Each of the two counters has an additional input bus connected to it over which parts of the instruction bus ib are fed to it through a respective delay equalizer dt.

The output of the program counter pc feeds the address decoder of the control-unit memory ro, and the output of the skip counter sk is coupled to a first input of the instruction decoder id, which has a second input connected to the instruction bus ib. The instruction decoder id produces M control signals ic, such as the circuit-related ALU instructions, which perform an addition. These are then transferred over M individual control lines to the individual control subcircuits of the ALU, e.g., gate stages. The M control signals ic also control other subcircuits, such as the first electronic switch sl. The individual control connections are not shown.

The instruction decoder id further produces task request signals which are applied over the 16-bit task request bus tb to the scheduler sc. Thus, the desired program segment is also selectable via the program. The instruction decoder id is connected via a third input to the ALU u so that the requested program segment can also be controlled by an ALU operation. Another input of the scheduler sc has four bits of the instruction bus ib applied tc it via a delay equalizer dt. This offers many possibilities of producing particularly advantageous programs.

For testing purposes, the program counter pc can be incremented from an external device (not shown) via a first test terminal tl. The contents of the instruction bus ib, converted into serial data by the parallel-to-serial converter cu, are obtainable from a second test terminal t2. For this purpose, however, the clock rate of the central processor is greatly reduced, e.g., by a factor of 20, so that the serial output data is produced at a reduced output rate.

What is claimed is:

1. A digital data processor including an arithmetic logic unit ("ALU") that performs data processing operations, said ALU having first and second ALU inputs and an ALU output; a data memory having a data memory input and a data memory output; and a control unit connected to the data memory and the ALU by at least one data memory control bus and at least one ALU control bus, respectively, said digital data processor operating in synchronism with a clock signal to provide pipelined data processing operations sin response to pipelined instructions, said digital data processor comprising:
a buffer interposed between the ALU inputs and output and the data memory input and output to transfer data between said ALU and said data memory, said buffer controlled by said control unit via a buffer control bus;
a first bidirectional data link interconnecting the data memory input and output and the buffer, said first bidirectional data link comprising first and second unidirectional data buses on which data flows in opposite directions; and
a second bidirectional data link interconnecting said ALU inputs and output and said buffer, said second bidirectional data link comprising third and fourth unidirectional data buses on which data flows in the direction of the ALU inputs and a fifth unidirectional data bus on which data flows in the direction of the buffer from said ALU output;
wherein during one period of said clock signal, data transfers are performed over said first, second, third, fourth and fifth unidirectional data buses at the same time as said ALU performs said data processing operations, so that data transfers between the buffer and the ALU occur simultaneously with transfers between the buffer and the data memory;
wherein said buffer comprises address-selected memory cells which are switched through on any of the five unidirectional data buses and are read from or written into independent of each other;
wherein said control unit provides to the buffer over the buffer control bus decoded delayed branching instructions and conditional and unconditional skip instructions in a pipelined instruction sequence, said control unit comprising:

a control unit memory which holds an instruction list that is fetchable instruction word by instruction word, wherein an instruction word fetched during a period of said clock signal comprises all data-transfer instructions, control instructions, and ALU-operation instructions to be performed during an associated clock period, said instruction list being divided into segments, each said segment being executed without being interrupted by an interrupt, said instruction words being provided as outputs from said control-unit memory;

an instruction decoder that receives said instruction words from said control unit memory and provides said ALU-operation instructions to control said ALU, said instruction decoder further selectively providing task requests on a task request bus;

a set of task request terminals that receive a set of task requests from a device external to said control unit; and a scheduler to delay jump instructions connected to said set of task request terminals and to said instruction decoder, said scheduler operating only at the end of one of said segments currently being executed in said instruction list to selectively initiate a jump to the beginning of a selectable different one of said segments in said instruction list in response to task request signals applied to it from said task request terminals or from said instruction decoder.

2. The digital data processor as defined in claim 1, wherein said ALU performs at least one of the following functions on the pipelined data:

addition, right shifting and left shifting;

logic operations in the form of AND operations and exclusive-OR operations; and inversion of the applied data.

3. The digital data processor as claimed in claim 1, wherein said ALU has at least one switchable direct data bus connected from said ALU output to one of said first and second ALU inputs.

* * * * *